US011520585B2

(12) United States Patent
Lloyd et al.

(10) Patent No.: US 11,520,585 B2
(45) Date of Patent: Dec. 6, 2022

(54) PREFETCH STORE PREALLOCATION IN AN EFFECTIVE ADDRESS-BASED CACHE DIRECTORY

(71) Applicant: INTERNATIONAL BUSINESS MACHINES CORPORATION, Armonk, NY (US)

(72) Inventors: Bryan Lloyd, Austin, TX (US); Brian W. Thompto, Austin, TX (US); George W. Rohrbaugh, III, Charlotte, VT (US); Mohit Karve, Austin, TX (US); Vivek Britto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/220,115

(22) Filed: Apr. 1, 2021

(65) Prior Publication Data

US 2021/0342268 A1 Nov. 4, 2021

Related U.S. Application Data

(60) Provisional application No. 63/019,782, filed on May 4, 2020.

(51) Int. Cl.
*G06F 12/08* (2016.01)
*G06F 9/30* (2018.01)
(Continued)

(52) U.S. Cl.
CPC .......... *G06F 9/3013* (2013.01); *G06F 9/3824* (2013.01); *G06F 12/0238* (2013.01);
(Continued)

(58) Field of Classification Search
CPC .... G06F 9/384; G06F 12/1045; G06F 9/3012; G06F 9/3001; G06F 9/3824;
(Continued)

(56) References Cited

U.S. PATENT DOCUMENTS 4,030,072 A 6/1977 Bjornsson
9,047,198 B2 * 6/2015 Kannan ............... G06F 12/1027
(Continued)

OTHER PUBLICATIONS

X. Qiu and M. Dubois, "Moving address translation closer to memory in distributed shared-memory multiprocessors," in IEEE Transactions on Parallel and Distributed Systems, vol. 16, No. 7, pp. 612-623, Jul. 2005.*

(Continued)

*Primary Examiner* — Pierre Michel Bataille
(74) *Attorney, Agent, or Firm* — Brian F. Russell; Brian Restauro

(57) ABSTRACT

In at least one embodiment, a processing unit includes a processor core and a vertical cache hierarchy including at least a store-through upper-level cache and a store-in lower-level cache. The upper-level cache includes a data array and an effective address (EA) directory. The processor core includes an execution unit, an address translation unit, and a prefetch unit configured to initiate allocation of a directory entry in the EA directory for a store target EA without prefetching a cache line of data into the corresponding data entry in the data array. The processor core caches in the directory entry an EA-to-RA address translation information for the store target EA, such that a subsequent demand store access that hits in the directory entry can avoid a performance penalty associated with address translation by the translation unit.

19 Claims, 5 Drawing Sheets

(51) Int. Cl.
*G06F 9/38* (2018.01)
*G06F 12/02* (2006.01)
*G06F 12/0811* (2016.01)
*G06F 12/0862* (2016.01)
*G06F 12/1045* (2016.01)

(52) U.S. Cl.
CPC ...... *G06F 12/0811* (2013.01); *G06F 12/0862* (2013.01); *G06F 12/1045* (2013.01)

(58) Field of Classification Search
CPC ............... G06F 12/0238; G06F 9/3013; G06F 9/30032; G06F 12/0811; G06F 12/0862; G06F 12/02
See application file for complete search history.

(56) References Cited

U.S. PATENT DOCUMENTS

| | | | |
|---|---|---|---|
| 9,081,501 B2 | 7/2015 | Asaad et al. | |
| 9,811,501 B2* | 11/2017 | Kim | G06N 7/005 |
| 10,013,357 B2* | 7/2018 | Mukherjee | G06F 12/0862 |
| 10,146,535 B2 | 12/2018 | Corbal et al. | |
| 2010/0100683 A1* | 4/2010 | Guthrie | G06F 12/0862 711/E12.024 |
| 2014/0258674 A1* | 9/2014 | Kim | G06F 12/0862 711/204 |

OTHER PUBLICATIONS

J. Collins, S. Sair, B. Calder and D. M. Tullsen, "Pointer cache assisted prefetching," 35th Annual IEEE/ACM International Symposium on Microarchitecture, 2002. (MICRO-35). Proceedings., 2002, pp. 62-73.*
Method to Prime and De-prime the Accumulator Register for Dense Math Engine (MMA) Execution, Anonymously; Jul. 27, 2020.
Computer Organization and Architecture, Stallings, W.; 2019.
Dual Renaming Model of Accumulator Register for Dense Math Engine (Matrix-Multiple-Add) Execution, Anonymously; Jul. 27, 2020.

* cited by examiner

PREFETCH STORE PREALLOCATION IN AN EFFECTIVE ADDRESS-BASED CACHE DIRECTORY

BACKGROUND OF THE INVENTION

The present invention relates in general to data processing and, in particular, to a processor that, based on receipt of a prefetch store request, preallocates a directory entry in an effective address-based directory of an upper-level store-through cache without prefetching a corresponding cache line of data into the data array of the upper-level cache.

A conventional multiprocessor (MP) computer system, such as a server computer system, includes multiple processing units, each including one or more processor cores. The processing units are all coupled to an interconnect fabric, which typically comprises one or more address, data and control buses. Coupled to the interconnect fabric are one or more system memories, which together form the lowest level of processor-addressable memory in the multiprocessor computer system and which are generally accessible for read and write access by all processing units. In order to reduce access latency to instructions and data residing in the system memory, each processing unit (or processor core) is typically further supported by a respective multi-level vertical cache hierarchy.

Cache memories are commonly utilized to temporarily buffer memory blocks from system memory that are likely to be accessed by a processor core in order to speed up processing by reducing access latency introduced by having to load needed data and instructions from system memory. In some MP systems, the vertical cache hierarchy associated with each processor core includes at least two levels, commonly referred to as level one (L1) and level two (L2) caches. The L1 cache is generally a relatively small cache that is characterized by the lowest access latency. In many cases, the L1 cache is a private cache, meaning that the L1 cache is associated with a particular processor core and cannot be directly accessed by other processor cores in the MP system. The L2 cache is generally a relatively larger cache having a higher access latency than the associated L1 cache. In some operating modes or implementations, an L2 cache can be shared by multiple processor cores. In some cases, the vertical cache hierarchy associated with a given processor core may include additional lower levels, such as a level three (L3) cache.

In some cases, a processor core may include a prefetch unit that is designed to access data likely to be subject to a demand access by the processor core in advance of the demand access and store the data into the processor core's vertical cache hierarchy. By accessing and caching the data in advance of a demand access, a process referred to as "prefetching," the overall access latency to which demand accesses of the processor core are subject can be reduced. Prefetched data is commonly buffered in lower-level caches (e.g., L2 and/or L3 caches) rather than upper-level caches (e.g., L2 and/or L3 caches) in order to reduce the "pollution" of the smaller upper-level caches with memory blocks that may or may not ever be required to satisfy a demand access of the associated processor core.

The particular memory blocks buffered in the various caches of an MP system are identified in each cache's directory utilizing addresses associated with the memory blocks. In some MP systems, some or all of the caches in a vertical cache hierarchy of a processor core implement real address (RA) directories that specify the real addresses in system memory of the cached memory blocks. In other MP systems, one or more of the caches in the vertical cache hierarchy of a processor core instead implement effective address (EA) directories that specify addresses of cached memory blocks in an effective address space utilized by the processor cores to support address virtualization and aliasing.

Depending on the various design tradeoffs known to those skilled in the art, the L1 cache in the cache hierarchy can be implemented as either a store-in cache or a store-through cache. If a store-in L1 cache is implemented, data updated by the processor core is initially stored into the processor core's L1 cache, but not into lower levels of the vertical cache hierarchy of the processor core or into the system memory. In contrast, if the L1 cache is implemented as a store-through cache, the data updated by the processor core is stored into a lower level cache (e.g., the L2 cache) in the vertical cache hierarchy of the processor core and optionally stored into the L1 cache of the processor core as well.

BRIEF SUMMARY

In at least some embodiments, a processing unit includes a vertical cache hierarchy including at least a store-through upper-level cache and a store-in lower-level cache. The upper-level cache includes a data array and an effective address (EA) directory having a plurality of directory entries each corresponding to a respective data entry among a plurality of data entries in the data array. The processing unit also includes a processor core. The processor core includes an execution unit configured to process memory access instructions and, based on processing the memory access instructions, initiate accesses to the vertical cache hierarchy. The processor core additionally includes a translation unit configured to translate EAs to real addresses (RAs) and a prefetch unit that prefetches data into the vertical cache hierarchy for access by the processor core. The prefetch unit is configured to initiate allocation of a directory entry in the EA directory for a store target EA without prefetching a cache line of data into the corresponding data entry in the data array. The processor core caches in the directory entry EA-to-RA address translation information for the store target EA, such that a subsequent demand store access that hits in the directory entry can avoid a performance penalty associated with address translation by the translation unit.

In some embodiments, the described preallocation of entries in the EA directory for a store prefetch stream also results in a bandwidth improvement. For example, in some embodiments, the upper-level cache includes multiple load and store execution pipelines that can access the EA directory in parallel, but only a single translation pipeline feeding into the translation unit. Preallocation of directory entries in the EA directory for store prefetch streams increases the probability of hits in the EA directory, thus preserving bandwidth in the translation pipeline.

DETAILED DESCRIPTION

Figure 1:
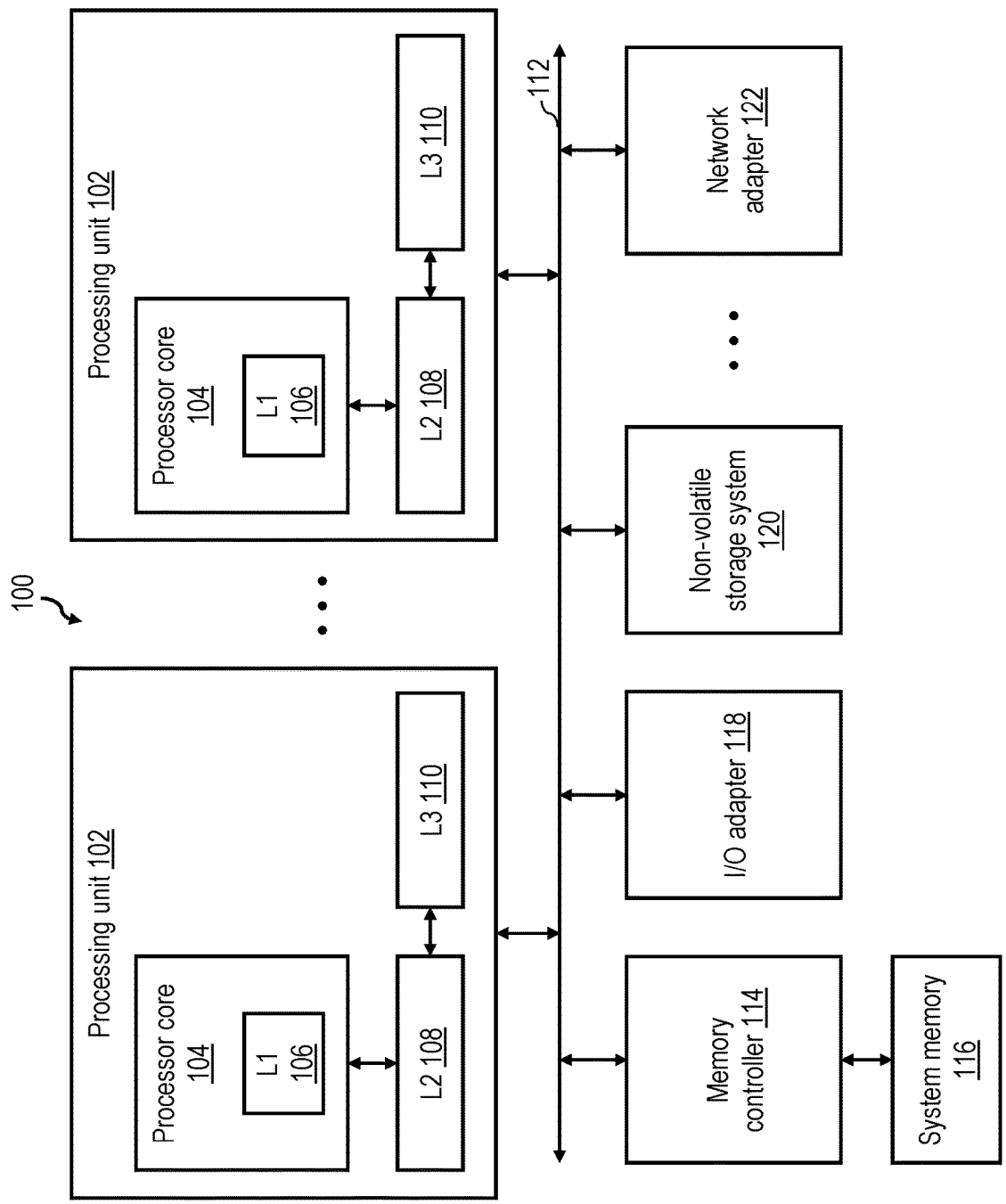
FIG. 1 is a high-level block diagram of an exemplary data processing system in accordance with one embodiment.

With reference now to the figures and in particular with reference to FIG. 1, there is illustrated a high-level block diagram of a data processing system 100 in accordance with one embodiment. In some implementations, data processing system 100 can be, for example, a server computer system (such as one of the POWER series of servers available from International Business Machines Corporation), a mainframe computer system, a mobile computing device (such as a smartphone or tablet), or a laptop or desktop personal computer system. In other implementations, data processing system 100 can alternatively be an embedded processor system.

As shown, data processing system 100 includes one or more processing units 102 that process instructions and data. Each processing unit 102 may be realized as a respective integrated circuit having a semiconductor substrate in which integrated circuitry is formed, as is known in the art. In at least some embodiments, processing units 102 can generally implement any one of a number of commercially available processor architectures, for example, POWER, ARM, Intel x86, NVidia, etc. In the depicted example, each processing unit 102 includes one or more processor cores 104 each coupled to a respective vertical cache hierarchy providing low latency access to instructions and operands likely to be read and/or written by the associated processor core 104. In the depicted example, the vertical cache hierarchy coupled to each processor core 104 includes at least a store-through L1 cache 106 characterized by a relatively smaller storage capacity and lower access latency and a store-in L2 cache 108 characterized by a relatively larger storage capacity and higher access latency. In some embodiments, like that depicted in FIGS. 2-3, L1 cache 106 may be bifurcated into an L1 instruction (I) cache 203 and a separate L1 data (D) cache 302. Optionally, the vertical cache hierarchy may further include an L3 cache 110, which provides yet greater storage capacity than L2 cache 108 at higher access latency. In some embodiments, L3 cache 110 may be implemented in a lookaside configuration.

Processing units 102 are coupled for communication with each other and with other system components by a system interconnect 112, which in various implementations may include one or more buses, switches, bridges, and/or hybrid interconnects. The other system components coupled to system interconnect 112 can include, for example, a memory controller 114 that controls access by processing units 102 and other components of data processing system 100 to a system memory 116. In addition, data processing system 100 may include an input/output (I/O) adapter 118 for coupling one or I/O devices to system interconnect 112, a non-volatile storage system 120, and a network adapter 122 for coupling data processing system 100 to a communication network (e.g., a wired or wireless local area network and/or the Internet).

Those skilled in the art will additionally appreciate that data processing system 100 shown in FIG. 1 can include many additional non-illustrated components. Because such additional components are not necessary for an understanding of the described embodiments, they are not illustrated in FIG. 1 or discussed further herein. It should also be understood, however, that the enhancements described herein are applicable to data processing systems and processors of diverse architectures and are in no way limited to the generalized data processing system architecture illustrated in FIG. 1.

Figure 2:
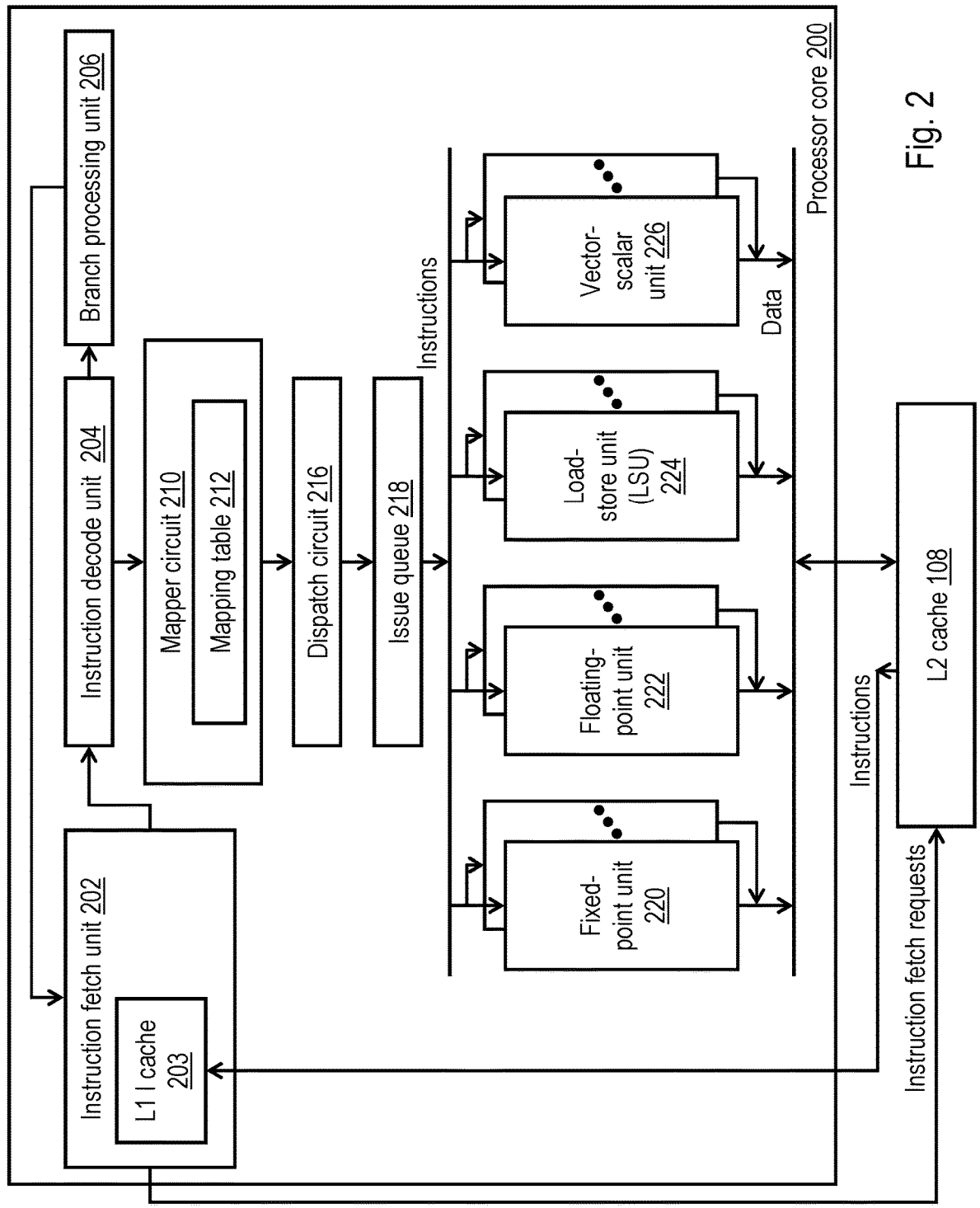
FIG. 2 is a high-level block diagram of a processor core in accordance with one embodiment.

Referring now to FIG. 2, there is depicted a high-level block diagram of an exemplary processor core 200 in accordance with one embodiment. Processor core 200 may be utilized to implement any of processor cores 104 of FIG. 1. Although not required, in a preferred embodiment, processor core 200 preferably supports simultaneous multithreading (SMT) and thus is capable of independently executing instructions in multiple hardware threads of execution simultaneously.

In the depicted example, processor core 200 includes an instruction fetch unit 202 that fetches instructions within one or more streams of instructions from lower level storage (e.g., L2 cache 108) and buffers fetched instructions in L1 I cache 203. In a typical implementation, each instruction has a format defined by the instruction set architecture of processor core 200 and includes at least an operation code (opcode) field specifying an operation (e.g., fixed-point or floating-point arithmetic operation, vector operation, matrix operation, logical operation, branch operation, memory access operation, etc.) to be performed by processor core 200. Certain instructions may additionally include one or more operand fields directly specifying operands or implicitly or explicitly referencing one or more core registers storing source operand(s) to be utilized in the execution of the instruction and one or more core registers for storing destination operand(s) generated by execution of the instruction. Instruction decode unit 204, which in some embodiments may be merged with instruction fetch unit 202, decodes the instructions fetched by instruction fetch unit 202 and forwards branch instructions that control the flow of execution to branch processing unit 206 for processing. In some embodiments, the processing of branch instructions performed by branch processing unit 206 may include speculating the outcome of conditional branch instructions. The results of branch processing (both speculative and non-speculative) by branch processing unit 206 may, in turn, be utilized to redirect one or more streams of instruction fetching by instruction fetch unit 202.

Instruction decode unit 204 forwards instructions that are not branch instructions (often referred to as "sequential instructions") to mapper circuit 210. Mapper circuit 210 is responsible for the assignment of physical registers within the register files of processor core 200 to instructions as needed to support instruction execution. Mapper circuit 210 preferably implements register renaming. Thus, for at least some classes of instructions, mapper circuit 210 establishes transient mappings between a set of logical (or architected) registers referenced by the instructions and a larger set of physical registers within the register files of processor core 200. As a result, processor core 200 can avoid unnecessary serialization of instructions that are not data dependent, as might otherwise occur due to the reuse of the limited set of architected registers by instructions proximate in program order. Mapper circuit 210 maintains a mapping data structure, referred to herein as mapping table 212, which is utilized to track free physical registers, transient mappings between logical register names and physical registers, and data dependencies between instructions.

Still referring to FIG. 2, processor core 200 additionally includes a dispatch circuit 216 configured to ensure that any data dependencies between instructions are observed and to dispatch sequential instructions as they become ready for execution. Instructions dispatched by dispatch circuit 216 are temporarily buffered in an issue queue 218 until the execution units of processor core 200 have resources available to execute the dispatched instructions. As the appropriate execution resources become available, issue queue 218 issues instructions from issue queue 218 to the execution units of processor core 200 based on instruction type opportunistically and possibly out-of-order with respect to the original program order of the instructions.

In the depicted example, processor core 200 includes several different types of execution units for executing respective different classes of instructions. In this example, the execution units of processor core 200 include one or more fixed-point units 220 for executing instructions that access fixed-point operands, one or more floating-point units 222 for executing instructions that access floating-point operands, one or more load-store units 224 for loading data from and storing data to storage, and one or more vector-scalar units 226 for executing instructions that access vector and/or scalar operands. In a typical embodiment, each execution unit is implemented as a multi-stage pipeline in which multiple instructions can be simultaneously processed at different stages of execution. Each execution unit preferably includes or is coupled to access at least one register file including a plurality of physical registers for temporarily buffering operands accessed in or generated by instruction execution.

Those skilled in the art will appreciate that processor core 200 may include additional unillustrated components, such as logic configured to manage the completion and retirement of instructions for which execution by execution units 220-226 is finished. Because these additional components are not necessary for an understanding of the described embodiments, they are not illustrated in FIG. 2 or discussed further herein.

Figure 3:
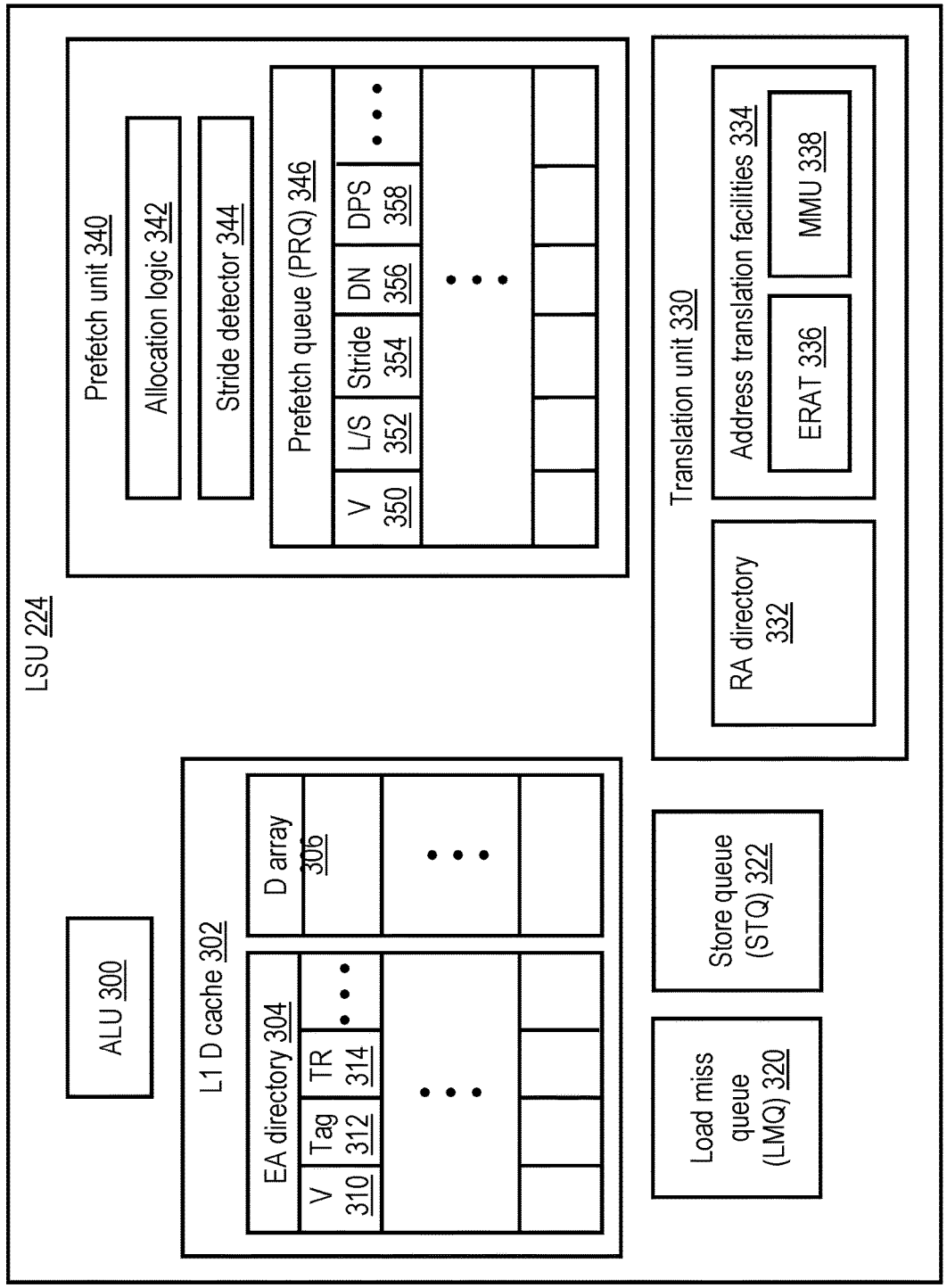
FIG. 3 is a high-level block diagram of an exemplary execution unit of a processing unit in accordance with one embodiment.

With reference now to FIG. 3, there is illustrated a high-level block diagram of an exemplary load-store unit (LSU) 224 of a processor core 200 in accordance with one embodiment. In this example, LSU 224 includes an arithmetic logic unit (ALU) 300 that receives operand value(s) of memory access instructions issued from issue queue 218 to LSU 224 and, based on the operand value(s), computes the target effective addresses (EAs) to which access is to be made by the memory access instructions. LSU 224 additionally includes store-through L1 D cache 302, which is preferably implemented with a conventional set-associative organization. L1 D cache 302 includes a data array 306 and an EA directory 304. Data array 306 contains a plurality of data entries for buffering cache lines of data likely to be accessed by processor core 200, and EA directory 304 contains a plurality of directory entries each corresponding to a respective one of the data entries in data array 306. Each of the directory entries in EA directory 304 includes, for example, at least a valid field 310 indicating whether or not contents of that directory entry are valid, an tag field 312 for specifying a tag portion of an EA of a cache line (which may or may not be buffered in the corresponding data entry of data array 306), and a translation (TR) field 314 for buffering EA-to-real address (RA) translation information for the EA specified by tag field 312. In at least some embodiments, the EA-to-RA translation information includes a pointer to an entry in a RA directory 332 storing the RA corresponding to the EA indicated by tag field 312. In at least some embodiments, RA directory 332 employs the same set-associative organization as EA directory 304, meaning that the combination of set and way associated with a given EA in EA directory 304 can also be utilized as a pointer to identify the corresponding RA in RA directory 332.

LSU 224 additionally includes a load miss queue (LMQ) 320 and a store queue (STQ) 322. LMQ 320 includes a plurality of entries for buffering load-type requests of processor core 200 that miss in L1 D cache 302 until the load-type requests can be satisfied by cache lines supplied by the associated L2 cache 108. STQ 322 buffers store-type requests of processor core 200 until the target addresses of the store-type requests can be translated and the store-type requests can be forwarded to L2 cache 108. In order to facilitate address translation, LSU 224 additionally includes a translation unit 330, which may include one or more address translation facilities 334 for address translation, such as an effective-to-real address translation (ERAT) cache 336 and/or a memory management unit (MMU) 338, which may in turn have facilities such a translation lookaside buffer (TLB) and/or segment lookaside buffer (SLB) for buffering address translation entries from in-memory address translation data structure(s). As noted, translation unit 330 also includes an RA directory 332 for buffering RAs corresponding to EAs translated by address translation facilities 334.

LSU 224 additionally includes a hardware prefetch unit 340, which initiates prefetching of data in one or more multiple prefetch streams from lower level storage into L1 D cache 302. In the depicted embodiment, prefetch unit 340 includes at least allocation logic 342, stride detector 344, and prefetch queue (PRQ) 346. Allocation logic 342 forms load prefetch streams and store prefetch streams, for example, based on demand load-type and store-type memory accesses received by LSU 224 and/or software-supplied prefetch hints. In response to determining to form a prefetch stream, allocation logic 342 allocates a PRQ entry to the prefetch stream within PRQ 346, possibly evicting an invalid PRQ entry or a valid PRQ entry associated with a previously formed prefetch stream (e.g., using a least recently used (LRU) replacement scheme). In some embodiments, each PRQ entry includes a valid field 350 indicating whether the contents of that PRQ entry are valid, a load/store (L/S) field 352 indicating whether the associated prefetch stream is fetching data for load-type or store-type memory accesses, a stride field 354 indicating a stride (e.g., number of cache lines) between accesses in the associated prefetch stream, a direction (DN) field 356 indicating a direction of stride (e.g., ascending or descending addresses), and a directory preallocate stream (DPS) field 358 indicating whether or not the prefetch stream is a store stream that should preallocate directory entries in EA directory 304 without fetching cache lines of data into the corresponding data entries of data array 306. In at least some embodiments, the initial values of stride field 354 and direction field 356 may be set by PRQ 346 based on default values (e.g., to prefetch the adjacent cache line at the next higher cache line address) and then updated by prefetch unit 340 based on a different stride detected in demand memory access requests by stride detector 344.

In operation, ALU 300 receives operand value(s) of a memory access instruction issued from issue queue 218 to LSU 224 and, based on the operand value(s), computes the target EA to which demand access is to be made by the memory access instructions. LSU 224 then performs a lookup of the target EA determined by ALU 300 in EA directory 304. In response to a cache hit in L1 D cache 302 for a load-type instruction, no address translation by translation unit 330 is required, and the requested data is retrieved from data array 306 into the core register(s) of processor core 200 assigned to the load-type instruction in mapping table 212. In response, however, to a cache miss in L1 D cache 302 for the load-type instruction, LSU 224 allocates an entry in LMQ 320 for a load-type memory access request corresponding to the load-type instruction, initiates EA-to-RA translation by translation unit 330, and after the target RA for the load-type request is determined, forwards the load-type request to L2 cache 108. In addition, L1 D cache 302 either allocates entries in EA directory 304 and data array 306 or merges the load access into existing entries (e.g., due to address aliasing). In response to return of the requested data from L2 cache 108, LSU 224 deallocates the entry in LMQ 320, installs the requested data in data array 306 and in the appropriate core register(s), and updates the relevant directory entry in EA directory 304. The RA determined by translation unit 330 is also preferably buffered in RA directory 332, and the relevant translation field 314 in the directory entry in EA directory 304 is updated to indicate the corresponding entry in RA directory 332.

As noted above, L1 D cache 302 is configured as a store-through cache. Consequently, in response to either a cache hit or a cache miss in L1 D cache 302 for a store-type instruction, LSU 224 allocates an entry in STQ 322 for a store-type memory access request corresponding to the store-type instruction. In addition, LSU 224 initiates EA-to-RA translation by translation unit 330, which on a store hit may include lookup of the relevant RA in RA directory 332 utilizing the contents of translation field 314 of the hit entry in EA directory 304. It should be appreciated, however, that on a store miss, L1 D cache 302 has no available information regarding the translation, and a performance penalty is incurred while the correct translation is determined by address translation facilities 334 (e.g., ERAT 336 or MMU 338) of translation unit 330. To eliminate this penalty for subsequent store-type requests to the same cache line, the RA determined by translation unit 330 is preferably buffered in RA directory 332, and the relevant translation field 314 in the directory entry in EA directory 304 is updated to indicate the corresponding entry in RA directory 332. After the target RA for the store-type request is determined, LSU 224 forwards the store-type request (including the target RA and any store data) to L2 cache 108 for servicing. On a store hit, LSU 224 also preferably updates data array 306 with the store data associated with the store-type instruction so that the updated data is available at low latency to potentially service a subsequent access to the updated cache line.

As indicated previously, prefetch unit 340 supplements demand memory access requests generated through the execution of explicit program instructions with load and store prefetch requests that speculatively fetch data into the vertical cache hierarchy of processor core 200 in advance of a demand access for the data. Conventional processor cores typically avoid prefetching store prefetch streams into store-through L1 caches because doing so generally results in lower performance, particularly for workloads containing heavy streams of demand store accesses. Prior art system instead seek to improve performance by "store gathering," which is the merging of multiple store-type accesses all targeting a common cache line into a single store-type access, typically at a lower-level cache (e.g., an L2 cache). Once store gathering for a cache line is closed, the lower-level cache will expend the bandwidth required to obtain a copy of the cache line to be updated from another processor core's vertical cache hierarchy or system memory.

In contrast to prior art systems that avoid store prefetching into a store-through L1 cache and thus any allocation of L1 directory or data entries, a processor core 200 in accordance with the present disclosure preferably implements an improved technique for store prefetching for its L1 cache 106. In accordance with the disclosed technique, performance of processor core 200 (and thus data processing system 100) is improved by preallocating directory entries in EA directory 304 for cache lines likely to be accessed by a subsequent demand store-type request without suffering the performance loss concomitant with prefetching the associated cache line data into the corresponding data entries of data array 306. By preallocating directory entries in EA directory 304 for store prefetch requests in this manner, subsequent demand store instructions that hit in EA directory 304 can avoid the performance penalty associated with EA-to-RA address translation by address translation facilities 334 that would otherwise be incurred.

Figure 4:
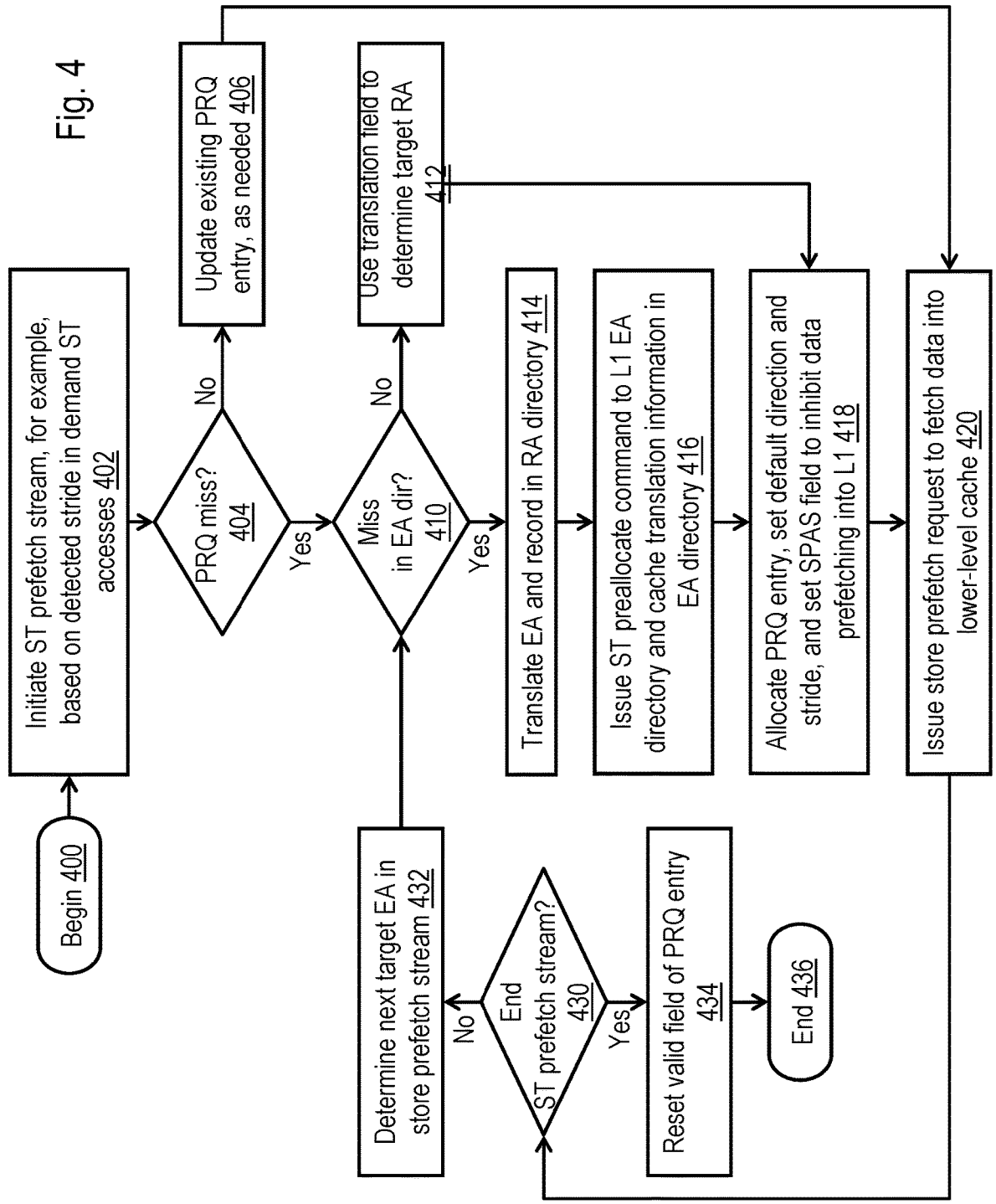
FIG. 4 is a high-level logical flowchart of an exemplary method of prefetch store preallocation in an effective address-based directory of an upper-level store-through cache in accordance with one embodiment.

Referring now to FIG. 4, there is depicted a high-level logical flowchart of an exemplary method of prefetch store preallocation in an EA-based directory of an upper-level store-through cache in accordance with one embodiment. The illustrated process can be performed, for example, by LSU 224 of FIG. 3. It should be appreciated that multiple instances of the illustrated process can be performed by LSU 224 in parallel for differing prefetch streams and/or differing hardware threads of execution.

The process of FIG. 4 begins at block 400 and then proceeds to block 402, which illustrates prefetch unit 340 of LSU 224 determining to initiate a store prefetch stream, for example, based on stride detector 344 detecting a repeated stride between the target EAs of multiple demand store instructions. As indicated at block 404, LSU 224 determines if an initial target EA in the prefetch stream (e.g., the target EA that is a stride from the target EA of the demand store instruction that triggered initiation of the store prefetch stream) falls within an existing store prefetch stream that has an entry allocated in PRQ 346. If so, prefetch unit 340 updates the existing entry in PRQ 346, if needed, for example, to update stride field 354 and/or direction field 356 to correspond to the stride and direction confirmed by the demand store access. Thereafter, the process of FIG. 4 passes to block 420, which is described below.

Referring again to block 404, in response to a determination that the initial target EA in the store prefetch stream missed in PRQ 346, LSU 224 additionally determines at block 410 whether or not the initial target EA of the prefetch stream misses in EA directory 304. If not (i.e., the target EA hits in EA directory 304), LSU 224 utilizes the contents of translation field 314 of the EA directory entry in which the target EA hits to determine the target RA for the next access in the store prefetch stream. For example, LSU 224 may utilize the pointer to RA directory 332 in translation field 314 to access the predetermined EA-to-RA translation for the next store prefetch, thus avoiding the performance penalty associated with address translation facilities 334 having to determine the correct EA-to-RA translation. The process of FIG. 4 then proceeds to block 418, which is described below.

Returning to block 410, in response to a determination that the target EA misses in EA directory 304, translation unit 330 utilizes its address translation facilities 334 (e.g., ERAT cache 336 or MMU 338) to perform EA-to-RA translation for the target EA. Translation unit 330 records the resulting RA in RA directory 332, possibly evicting an existing entry, if necessary. In addition, LSU 224 issues a store preallocate command to EA directory 304 to cause a directory entry in EA directory 304 to be allocated for the target EA (block 416). In the newly allocated directory entry, LSU 224 records the tag of the target EA in tag field 312, records in translation field 314 a pointer to the entry in RA directory 332 that contains the corresponding RA, and sets valid field 310. Although an entry is allocated in EA directory 304, it should be noted that LSU 224 refrains from prefetching the cache line of data identified by the target EA into the corresponding data entry in data array 306. However, by pre-caching the relevant translation information, a subsequent demand store request that hits on the directory entry can avoid the potentially significant performance penalty associated with EA-to-RA translation by address translation facilities 334 of translation unit 330 (e.g., up to and including a tablewalk of a page table in system memory 116).

At block 418, prefetch unit 340 additionally allocates an entry in PRQ 346 to the newly formed store prefetch stream. Within the newly allocated PRQ entry, prefetch unit 340 sets the load/store field 352 to indicate a store prefetch stream, sets stride field 354 and direction field 356 to default or detected values, sets DPS field 358 to inhibit data prefetching into data array 306 for the associated store prefetch stream, and sets valid field 350. The process then proceeds from block 418 to block 420, which illustrates prefetch unit 340 issuing a store prefetch request to a lower-level cache memory 108 or 110. In some embodiments, the store prefetch request indicates into which level of the vertical cache hierarchy (other than L1 D cache 302) the store prefetch data is to be installed.

At block 430, prefetch unit 340 determines whether or not to end the store prefetch stream initiated at block 402, for example, due to a predetermined number of demand store misses in EA directory 304. In response to a negative determination at block 430, prefetch unit 340 determines a next target EA in the store prefetch stream, for example, based on previous target EA in the store prefetch stream and the contents of stride field 354 and direction field 356 (block 432). The process of FIG. 4 then returns to block 410, which has been described. If, however, prefetch unit 340 determines at block 430 to end the store prefetch stream, prefetch unit 340 resets the valid field 350 of the entry in PRQ 346 allocated to the store prefetch stream (block 434). As a result, the PRQ entry will be made available for replacement by a newly allocated load or store prefetch stream. Following block 434, the process of FIG. 4 ends at block 436.

Figure 5:
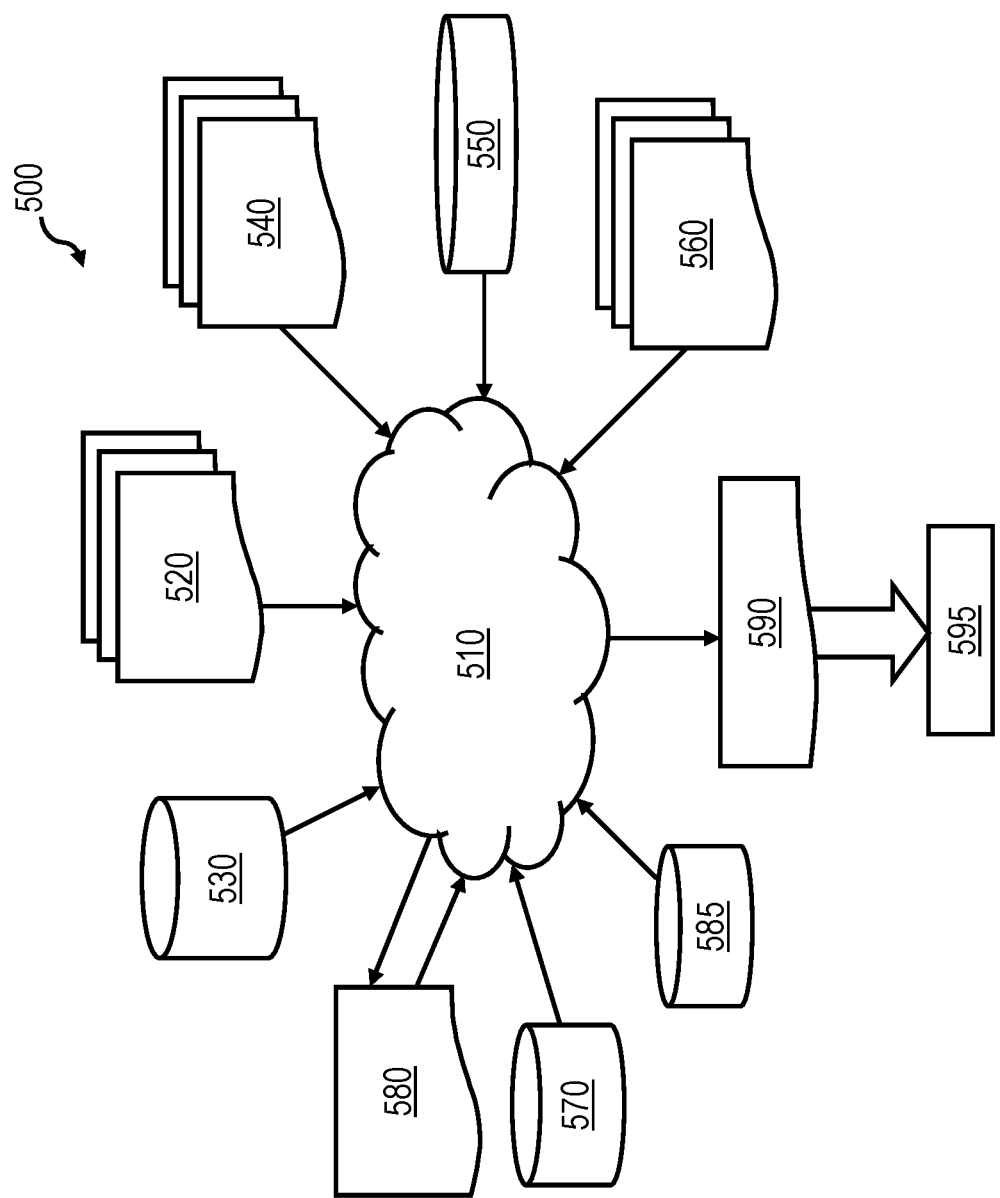
FIG. 5 is a block diagram of an exemplary design flow in accordance with one embodiment.

With reference now to FIG. 5, there is illustrated a block diagram of an exemplary design flow 500 used for example, in semiconductor IC logic design, simulation, test, layout, and manufacture. Design flow 500 includes processes, machines and/or mechanisms for processing design structures or devices to generate logically or otherwise functionally equivalent representations of the design structures and/or devices described above and shown herein. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 1020 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent an electronic component, circuit, electronic or logic module, apparatus, device, or system such as those shown herein. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures shown herein to generate a netlist 580 which may contain design structures such as design structure 520. Netlist 580 may comprise, for example, compiled or otherwise processed data structures representing a list of wires, discrete components, logic gates, control circuits, PO devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 50 nm, etc.). The data structure types may further include design specifications 540, characterization data 550, verification data 560, design rules 590, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g., information stored in an IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 590 may comprise a compiled, executable HDL simulation model that functionally simulates the devices shown herein.

Design structure 590 may also employ a data format used for the exchange of layout data of integrated circuits and/or symbolic data format (e.g., information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 590 may then proceed to a stage 595 where, for example, design structure 590: proceeds to tape-out, is released to manufacturing, is released to a mask house, is sent to another design house, is sent back to the customer, etc.

As has been described, in at least one embodiment, a processing unit includes a vertical cache hierarchy including at least a store-through upper-level cache and a lower-level cache. The upper-level cache includes a data array and an effective address (EA) directory having a plurality of directory entries each corresponding to a respective data entry among a plurality of data entries in the data array. The processing unit also includes a processor core. The processor core includes an execution unit configured to process memory access instructions and, based on processing the memory access instructions, initiate accesses to the vertical cache hierarchy. The processor core additionally includes a translation unit configured to translate EAs to real addresses (RAs) and a prefetch unit that prefetches data into the vertical cache hierarchy for access by the processor core. The prefetch unit is configured to initiate allocation of a directory entry in the EA directory for a store target EA without prefetching a cache line of data into the corresponding data entry in the data array. The processor core caches in the directory entry EA-to-RA address translation information for the store target EA, such that a subsequent demand store access that hits in the directory entry can avoid a performance penalty associated with address translation by the translation unit.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a processing unit, the method comprising:
prefetching operand data likely to be accessed by a processor core of the processing unit through the execution of demand memory access instructions into a vertical cache hierarchy including at least a set-associative store-through upper-level data cache and a store-in lower-level cache, wherein the set-associative upper-level cache includes a set-associative data array and a set-associative effective address (EA) directory having a plurality of directory entries each corresponding to a respective data entry among a plurality of data entries in the data array;
processing, in an execution of the processor core, memory access instructions and, based on processing the memory access instructions, initiating accesses to the vertical cache hierarchy;
initiating a store prefetch stream, and based on a prefetch miss of store target EA of the store prefetch stream in the set-associative EA directory, allocating a directory entry in the set-associative EA directory for the store target EA without prefetching an associated cache line of operand data identified by the store target EA into the corresponding data entry in the data array; and
translating the store target EA into real address (RA) and caching in the directory entry EA-to-RA address translation information for the store target EA, such that a subsequent demand store access that hits in the directory entry can avoid a performance penalty associated with address translation.

2. The method of claim 1, and further comprising prefetching data associated with the store target effective EA into the lower-level cache.

3. The method of claim 1, wherein:
the processor core includes a real address (RA) directory of the set-associative upper-level data cache; and
the EA-to-RA address translation information includes a pointer to a directory entry in the RA directory buffering an RA corresponding to the store target EA.

4. The method of claim 1, and further comprising:
allocating a queue entry among a plurality of queue entries in a prefetch queue (PRQ) to the store prefetch stream including the store target EA; and
indicating in the queue entry a direction and stride for the store prefetch stream.

5. The method of claim 4, and further comprising indicating in the queue entry that prefetching of operand data for the prefetch store stream into the upper-level cache is inhibited.

6. The method of claim 1, wherein:
the store target EA is a first store target EA; and
based on a hit of a second store target EA of a demand store access in the directory entry in the EA directory, utilizing the cached EA-to-RA address translation information to obtain the RA without translation of the second store target EA by the translation unit.

7. A processing unit, comprising:
a vertical cache hierarchy including at least a store-through set-associative upper-level data cache and a store-in lower-level cache, wherein the set-associative upper-level data cache includes a set-associative data array and a set-associative effective address (EA) directory having a plurality of directory entries each corresponding to a respective data entry among a plurality of data entries in the data array;
a processor core including:
an execution unit configured to process memory access instructions and, based on processing the memory access instructions, initiate accesses to the vertical cache hierarchy;
a translation unit configured to translate EAs to real addresses (RAs);
an operand data prefetch unit that prefetches, into the vertical cache hierarchy, operand data likely to be accessed by the processor core through execution of demand memory access instructions by the execution unit, wherein the operand data prefetch unit is configured, based on a prefetch miss in the set-associative EA directory for a store target EA, to initiate allocation of a directory entry in the set-associative EA directory for the store target EA without prefetching an associated cache line of operand data identified by the store target EA into the corresponding data entry in the data array; and
wherein the processor core caches in the directory entry EA-to-RA address translation information for the store target EA, such that a subsequent demand store access that hits in the directory entry can avoid a performance penalty associated with address translation by the translation unit.

8. The processor of claim 7, wherein the operand data prefetch unit is configured to prefetch operand data associated with the store target effective EA into the lower-level cache.

9. The processor of claim 7, wherein:
the processor core includes a real address (RA) directory of the set-associative upper-level data cache; and
the EA-to-RA address translation information includes a pointer to a directory entry in the RA directory buffering an RA corresponding to the store target EA.

10. The processor of claim 7, wherein:
the operand data prefetch unit includes a prefetch queue (PRQ) including a plurality of queue entries;
the operand data prefetch unit allocates a queue entry among the plurality of queue entries to a store prefetch stream including the store target EA; and
the queue entry indicates a direction and stride for the store prefetch stream.

11. The processor of claim 10, wherein the queue entry further indicates that prefetching of operand data for the prefetch store stream into the upper-level cache is inhibited.

12. The processor of claim 7, wherein:
the store target EA is a first store target EA; and
the processor core, based on a hit of a second store target EA of a demand store access in the directory entry in the EA directory, utilizes the cached EA-to-RA address translation information to obtain the RA without translation of the second store target EA by the translation unit.

13. A data processing system, comprising:
multiple processing units, including the processing unit of claim 7;
a shared memory; and
a system interconnect communicatively coupling the shared memory and the multiple processing units.

14. A design structure tangibly embodied in a machine-readable storage device for designing, manufacturing, or testing an integrated circuit, the design structure comprising:
a processing unit, including:

a vertical cache hierarchy including at least a set-associative store-through upper-level data cache and a store-in lower-level cache, wherein the set-associative upper-level data cache includes a set-associative data array and a set-associative effective address (EA) directory having a plurality of directory entries each corresponding to a respective data entry among a plurality of data entries in the data array;

a processor core including:
  an execution unit configured to process memory access instructions and, based on processing the memory access instructions, initiate accesses to the vertical cache hierarchy;
  a translation unit configured to translate EAs to real addresses (RAs);
  an operand data prefetch unit that prefetches, into the vertical cache hierarchy, operand data likely to be accessed by the processor core through execution of demand memory access instructions by the execution unit, wherein the operand data prefetch unit is configured, based on a prefetch miss in the set-associative EA directory for a store target EA, to initiate allocation of a directory entry in the set-associative EA directory for the store target EA without prefetching an associated cache line of operand data identified by the store target EA into the corresponding data entry in the data array; and
  wherein the processor core caches in the directory entry EA-to-RA address translation information for the store target EA, such that a subsequent demand store access that hits in the directory entry can avoid a performance penalty associated with address translation by the translation unit.

15. The design structure of claim 14, wherein the operand data prefetch unit is configured to prefetch operand data associated with the store target effective EA into the lower-level cache.

16. The design structure of claim 14, wherein:
  the processor core includes a real address (RA) directory of the set-associative upper-level data cache; and
  the EA-to-RA address translation information includes a pointer to a directory entry in the RA directory buffering an RA corresponding to the store target EA.

17. The design structure of claim 14, wherein:
  the operand data prefetch unit includes a prefetch queue (PRQ) including a plurality of queue entries;
  the operand data prefetch unit allocates a queue entry among the plurality of queue entries to a store prefetch stream including the store target EA; and
  the queue entry indicates a direction and stride for the store prefetch stream.

18. The design structure of claim 17, wherein the queue entry further indicates that prefetching of operand data for the prefetch store stream into the upper-level cache is inhibited.

19. The design structure of claim 14, wherein:
  the store target EA is a first store target EA; and
  the processor core, based on a hit of a second store target EA of a demand store access in the directory entry in the EA directory, utilizes the cached EA-to-RA address translation information to obtain the RA without translation of the second store target EA by the translation unit.

* * * * *